United States Patent [19]

Linville

[11] Patent Number: 4,679,519
[45] Date of Patent: Jul. 14, 1987

[54] LAMINATED CLOTH CONSTRUCTION

[76] Inventor: James C. Linville, 2 Golden Ct., Rowayton, Conn. 06853

[21] Appl. No.: 674,764

[22] Filed: Nov. 26, 1984

[51] Int. Cl.$^4$ ............................................. B63H 9/04
[52] U.S. Cl. .................................... 114/103; 428/246
[58] Field of Search ............... 428/224, 232, 246, 252, 428/284, 292, 294, 297, 298, 105, 104, 110, 253, 247, 111, 910, 114; 156/177, 178, 179, 436, 440; 114/103

[56] References Cited

U.S. PATENT DOCUMENTS

| | | | |
|---|---|---|---|
| 2,281,635 | 5/1942 | Strauss | 428/294 |
| 2,552,774 | 5/1951 | Fihe | 428/232 |
| 2,749,965 | 6/1956 | Manning | 428/232 |
| 3,222,237 | 12/1965 | McKelvy | 428/110 |
| 3,644,165 | 2/1972 | Chen | 428/110 |
| 3,668,051 | 6/1972 | Seemann | 428/232 |
| 3,900,625 | 8/1975 | Chen | 428/110 |
| 3,983,282 | 9/1976 | Seeman | 428/114 |
| 4,136,630 | 1/1979 | Fraser | 114/103 |
| 4,444,822 | 4/1984 | Doyle et al. | 428/297 |
| 4,503,108 | 3/1985 | Clausen et al. | 428/114 |

*Primary Examiner*—James J. Bell
*Attorney, Agent, or Firm*—St. Onge Steward Johnston & Reens

[57] ABSTRACT

Flexible laminates and methods for their preparation are disclosed. The laminates comprise co-extensive layers bonded together at their interfaces by a synthetic resin adhesive. One outer layer comprises a sheet of dimensionally stable (i.e. stretch resistant) synthetic resin film and the other outer layer is woven fabric, scrim, warp-knit fabric or a synthetic resin film. The laminate has at least one layer which is a warp of spaced individual strands of a stretch resistant synthetic polymer (polyamides and especially aromatic polyamides preferred). Where the second outer layer is a fabric the strands in the inner layer warp are oriented parallel to, or at an acute angle to, the warp in said fabric.

In one embodiment the flexible laminates have two inner layers each comprised of a warp of individual spaced apart strands of polymer fiber, the strands in one layer being oriented in a direction which is at an acute angle with respect to the direction of orientation of the strands in the other layer.

Continuous methods of preparing the various laminates are also described.

The flexible laminates find especial utility as cloth from which can be fabricated lightweight sails having high strength and stretch resistance in the direction of orientation of the warp strands as well as sufficient stretch and tear strength to withstand the loads in all other directions in the sail.

13 Claims, 10 Drawing Figures

LAMINATED CLOTH CONSTRUCTION

BACKGROUND OF THE INVENTION

This invention relates to the making of flexible laminates and is more particularly concerned with laminates useful in the fabrication of sails and the like, with sails so produced, and with methods for the making of such laminates.

DESCRIPTION OF THE PRIOR ART

Significant advances have been made in recent years in the construction of lightweight sails having high stretch resistance and strength and particularly adapted for use in racing competitions. Sailcloth representative of the present state of the art is designed to have extremely high stretch resistance and strength in one principal direction and yet possess sufficient stretch resistance and strength in other directions to permit handling of loads imposed on the sail by stresses in directions other than the aforesaid principal direction. The sailcloth of this type is assembled into a sail by uniting a series of panels of the cloth in such a way that the principal direction or axis of the cloth which possesses the high stretch resistance and strength is oriented in the direction in which the major stresses will be placed on the sail when in use.

Sailcloths having the above characteristics are prepared in general by bonding together in the form of a laminate, a stretch resistant film of synthetic polymer such as the polyester (polyethylene terephthalate) film which is available under the trademark Mylar from Du Pont Company, and a substrate which takes the form of a substantially orthogonal combination of warp and fill yarns in a scrim taffeta or warp knit. One of the course of yarns (warp or fill) in this substrate is intended to bear the major load which will be exerted on the finished laminate and therefore consists of a high stretch resistant and high tensile modulus fiber such as a high tensile modulus polyester or polyamide. A particularly desirable fiber is that fabricated from the aromatic polyamide [also known as an aramid] available from the Du Pont Company under the trademark Kevlar. The other course of yarn serves to hold the fabric together (except in the case of warp-knits where the knit yarn performs this function) as well as providing tear strength, burst strength and seamability (i.e. the ability of the resulting cloth to be joined to abutting strips by means of stitched and/or adhesively bonded seams).

The layers of material in the above laminates are bonded to each other throughout their entire interfaces by means of synthetic resin adhesives such as polyurethanes, cross-linked polyester thermosets and the like.

A particular example of the above type of laminate is that described in U.S. Pat. No. 4,444,822 in which a film of stretch resistant synthetic resin film is bonded to an unwoven, warp-knit scrim. The latter comprises a system of spaced parallel strands, the strands in one layer crossing the strands in the other layer and the crossing strands in the two layers being tied together by means of a knit strand. The strands are fabricated from polymeric fibers such as polyesters, polyamides and the like.

However, the use of such warp-knit scrims and other related warp-knit or woven fabrics gives rise to a number of problems. The over/under yarn pattern present in taffetas or scrims or the misalignment of the tie yarns in warp-knits can give rise to crimps in the load bearing yarns of the resulting laminates, thereby detracting from the desired stretch resistance and strength in the load-bearing axis of the laminate. Further, the warp-knits or woven fabrics produced from high stretch resistant fibers such as those from polyesters and polyamides, especially the preferred polyamides such as the aromatic polyamides of which that available under the trademark Kevlar is particularly preferred, are relatively expensive to produce and add significantly to the cost of the laminates into which they are incorporated.

We have now found that laminates can be produced which have all the desirable features discussed above but which are free from the disadvantages inherent in those hitherto available and which can be produced readily and inexpensively by methods to be described hereinafter.

SUMMARY OF THE INVENTION

It is an object of the invention to provide flexible laminates having high stretch resistance and strength in the direction or axis along which the laminate will be subject to maximum stress. It is a further object of the invention to provide flexible laminates which are reinforced along a principal axis but are free from crimp.

Yet another object of the invention is to reduce the cost of manufacturing flexible laminates having high stretch resistance and strength along the direction of reinforcement, which laminates are especially adapted for use in the fabrication of sails.

The above objects are achieved by providing flexible laminates in accordance with the invention in which the principal reinforcement incorporated in the laminate comprises a warp formed of individual, preferably spaced apart strands of polymeric fiber having high stretch resistance and strength and aligned in the direction in which the laminate is to be subjected to the major stress when utilized in the fabrication of articles such as sails, tarpaulins, awnings and the like.

The invention also comprises methods for the manufacture of the above type of laminate on a continuous or semi-continuous basis. The invention further comprises improved sailcloth and sails fabricated from the above type of laminate.

Other objects and advantages of the invention will become apparent to one skilled in the art from the detailed description and exemplification of the invention which follows.

DETAILED DESCRIPTION OF THE INVENTION

Figure 1:
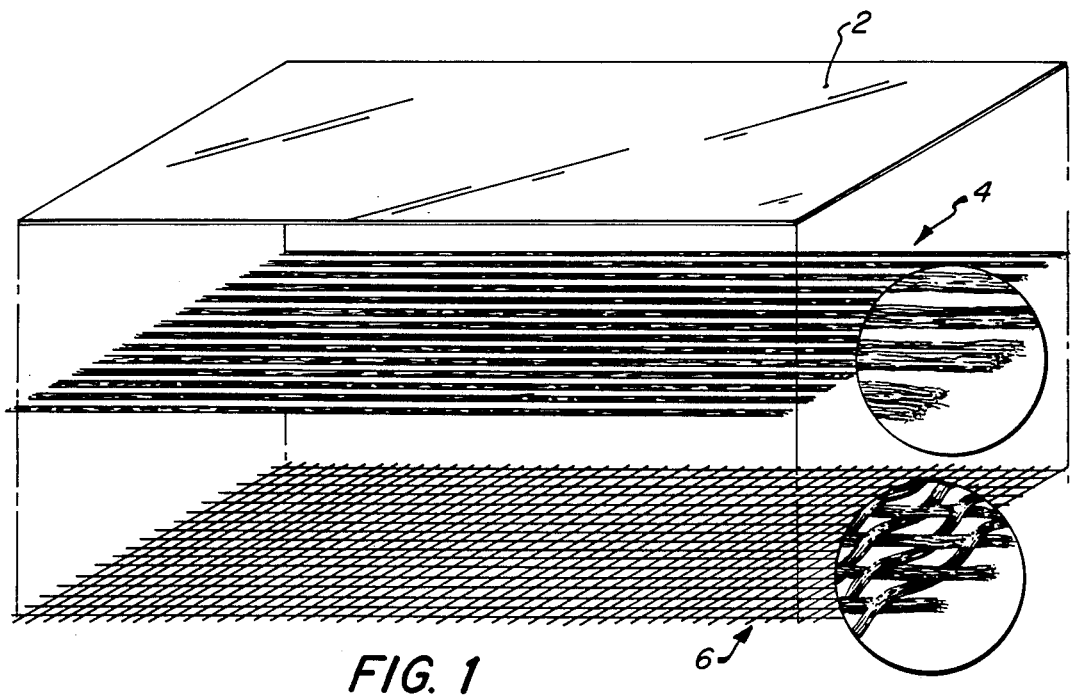
FIG. 1 is an exploded view of a laminate in accordance with the invention.

The principal feature which distinguishes the flexible laminates of the invention from those previously available lies in the nature of the primary reinforcing means employed in the laminate. Thus, whereas the art has employed reinforcing means in the form of woven fabric, warp-knits or scrim, the laminates of the present invention employ a warp of individual strands of fiber which strands are spaced apart and not connected or held in a predetermined pattern by a fill yarn or a knit strand as in the case of the prior art.

The use of the warp of individual strands not only results in a significant reduction in cost of the finished laminate but provides excellent reinforcement of the laminate in the direction in which the strands are aligned and imparts high strength and resistance to stretch in that direction. Further, because the strands in the warp can be aligned in a converging or diverging pattern as well as in a parallel configuration, it is possible to impart reinforcement to the finished laminate in a variety of predetermined directions in the laminate. As will be obvious to one skilled in the art, and as will be discussed further hereinafter, the reinforcing means employed in the laminates of the invention thereby provides greater versatility in the nature of the reinforcement which can be imparted to the finished laminate and to sailcloth and like articles which are fabricated from the laminate.

The strands of fiber which are employed in the warp of the reinforcing means in accordance with the invention are fabricated from synthetic polymeric fibers having high stretch resistance. By fiber having high stretch resistance is meant fiber having a tensile strength modulus of the order of at least about 5 grams/denier. Illustrative of such fibers are those fabricated from polyamides such as nylon and the material available under the trademark Kevlar (an aromatic polyamide also known as an Aramid), polyesters such as those available under the trademarks Dacron, Fortrel and the like, polyimides and polyamidimides.

In general the fibers employed as the strands in the warp have deniers in the range of about 20 to about 10,000, preferably within the range of about 200 to about 2000, and most preferably within the range of 400 to 1000.

The warp of individual strands of fiber is incorporated as an inner layer in the laminates in accordance with the invention and preferably is sandwiched between at least two other layers. One of the outer layers of the laminate is fabricated from a film having high stretch resistance. Such films are well-known and conventionally employed in the laminates hitherto available. Illustrative of such films are the drawn, oriented polyester films such as that available under the trademark Mylar. Other films having high tensile modulus are those fabricated from polymers such as nylon, polypropylene and the like. Advantageously, the films have a thickness of the order of about 0.25 mils to about 20 mils, preferably from about 0.5 mils to about 3 mils, and most preferably from about 1 to 2 mils.

The other outer layer of the laminates of the invention can also be a film which is identical to, or of the same type as, that employed in the above-described first outer layer. Alternatively, the other outer layer comprises a fabric which can take the form of a woven or non-woven fabric, a warp-knit fabric or a scrim fabric. The fabric is advantageously one in which the yarns are comprised of multiple fibers or monofilaments of synthetic materials such as those described above from which are fabricated the fibers of the reinforcing warp employed in the laminates of the invention. A preferred outer layer is one fabricated from polyester fibers available under the trademark Dacron and which takes the form of a woven fabric such as taffeta.

In addition to the two outer layers and the inner layer of individual strands of the reinforcing warp employed in the laminates of the invention, there can be present one or more additional layers which layers can be formed of any of the films or fabrics described above. Such additional layers include a second layer of a warp of individual spaced apart strands of reinforcing material. Where such a second layer is employed the strands in the two such layers are preferably oriented so that the strands in one layer are aligned in a direction which describes an acute angle, advantageously an angle in the range of about 2° to about 20°, and preferably in the range of about 3° to about 10°, with respect to the direction of alignment of the strands in the other layer.

The various layers in the laminates of the invention are bonded together throughout the whole of their interfaces by any of the adhesives employed in the art. Illustrative of such adhesives are the synthetic resins, generally available in solvent bases, such as polyurethanes, polyester thermosets and the like.

In one embodiment of the invention the individual strands in the reinforcing warp are aligned in substantially evenly spaced apart, parallel relationship in the direction in which the maximum strength is desired in the laminate. In another embodiment the strands are oriented in a pattern in which they diverge in radial fashion from a central focus. Such an arrangement is particularly advantageous when the laminate is to be employed to reinforce a corner or "gore" of a sail. The reinforcing effect of the warp of strands in such an instance is provided in a radial or spoke-like fashion extending outwards from the corner of the sail.

The laminates of the invention and methods for their preparation will now be described in further detail with reference to the accompanying drawings.

FIG. 1 shows, in an exploded view, the three layers which are incorporated in a specific embodiment of a larminate of the invention. The layer (2) is a drawn, oriented polyester film having a thickness of the order of about 2 mils. Layer (4) is a warp of parallel, spaced apart strands of a synthetic polymer, advantageously an aromatic polyamide (Kevlar), oriented along the length of the finished laminate and layer (6) is a woven fabric in which both warp and fill are comprised of a synthetic fiber, advantageously a polyester such as that available under the trademark Dacron from Du Pont Company. The number of strands per unit width in the layer (4) can be varied over a wide range. Advantageously the number of strands per inch, taken across the warp, is of the order of about 1 to about 50, preferably from about 5 to about 20 and most preferably from about 10 to about 20.

The three layers in FIG. 1 are substantially co-extensive in area and are bonded together across their entire interfaces by a synthetic resin adhesive such as a solvent based, heat activated urethane adhesive of which that available from Morton Chemical Company under the trademark Adcote 122 is typical. The laminate is advantageously formed by coating one side of the film (2) with adhesive solution, removing the solvent therefrom by appropriate means such as by heating to evaporate the solvent, and then applying the warp (4) to the tacky surface of the film (2), followed by the fabric layer (6). Pressure is applied over the entire area of the laminate in order to ensure uniformity in bonding of the layers together. The amount of adhesive employed is preferably such that the adhesive penetrates the fibers of the warp (4) and also the interstices in the woven fabric (6). Excessive amounts of adhesive should be avoided in order to minimize contamination of equipment such as press plates, nip rolls and the like which are employed in laminating the layers together. The fabrication of the laminate can be effected in a batch-like operation using specifically defined precut layers as illustrated in FIG. 1 or can be prepared in a continuous manner as will be described more fully below. In FIG. 1, the individual strands in warp layer (4) are shown in flattened form as they appear after formation of the laminate and the strands are shown in exaggerated size for purposes of clarity.

Figure 2:
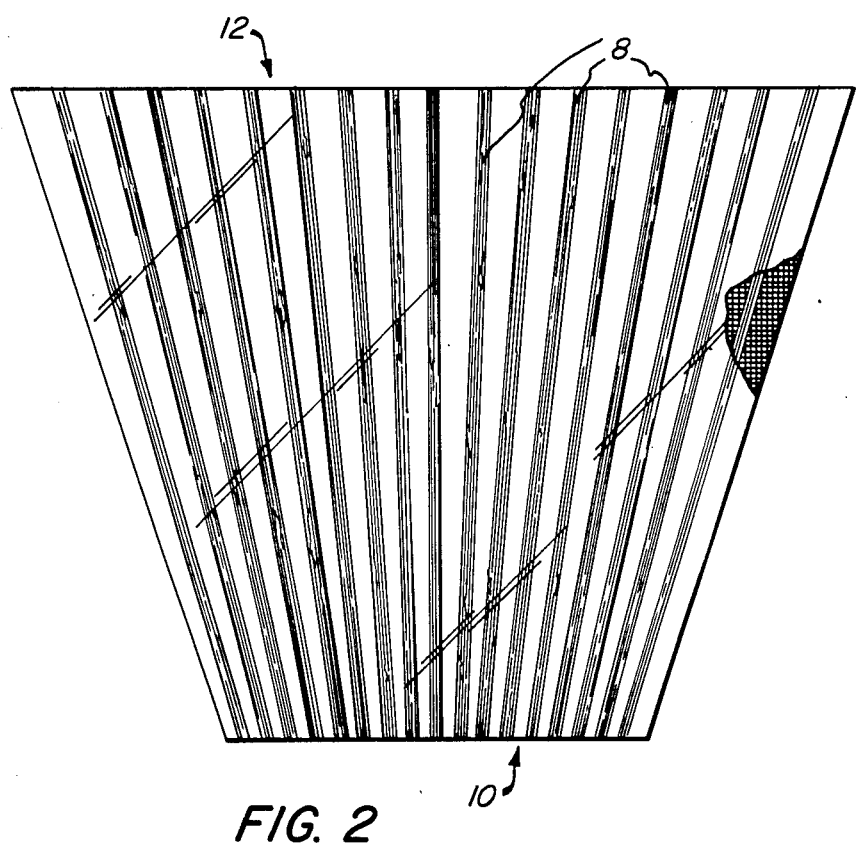
FIG. 2 is a plan view of another embodiment of a laminate in accordance with the invention.

FIG. 2 illustrates another embodiment of a laminate in accordance with the invention shown in plan view with the outer film layer uppermost thereby leaving the warp of reinforcing strands (8) visible through the film layer. In this embodiment the individual strands (8) are disposed in a radial or spoke-like pattern diverging outwards from the narrow end (10) of the laminate and fanning out through the length of the laminate to the broader end (12). This particular embodiment is desirable for use in the corner of a sail or like article where it is necessary to reinforce strength of the laminate to meet radiating stress. The angle at which the individual strands diverge from the center-line a-a gradually increases from the innermost to the outermost strands over a range of about 2° to about 20° and preferably over a range of about 3° to about 10°.

Figure 3:
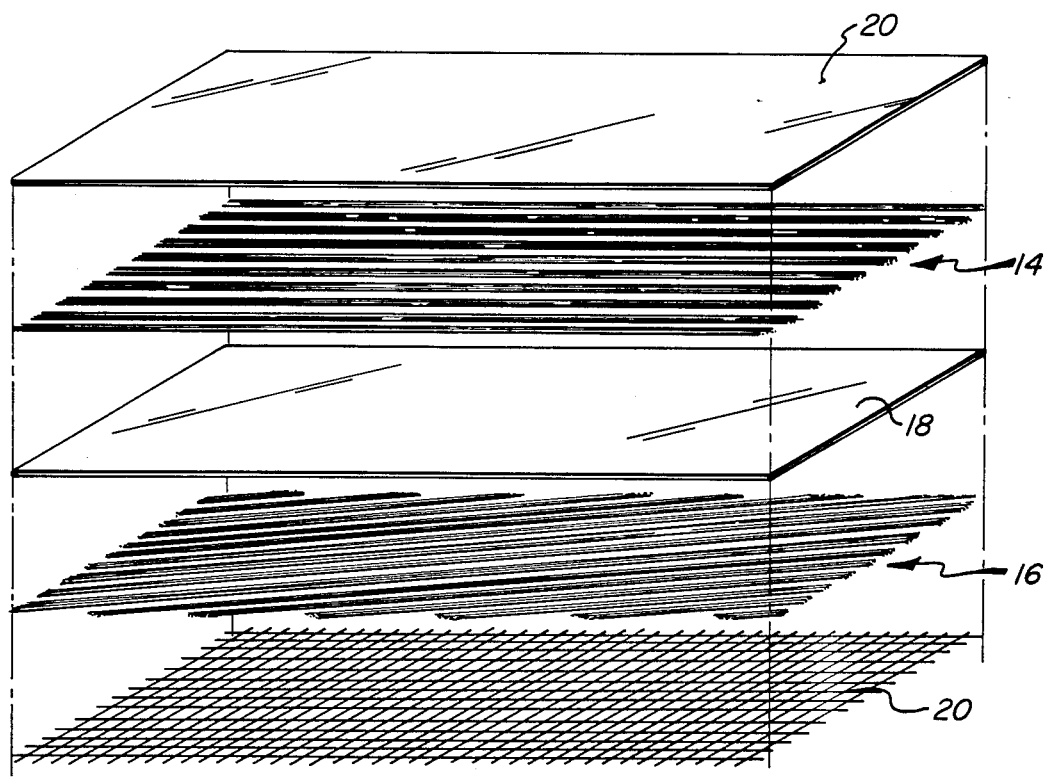
FIG. 3 is an exploded view of another embodiment of a laminate in accordance with the invention.

FIG. 3 illustrates an embodiment in which a laminate (shown in exploded view) is provided with two layers (14) and (16) of warp of individual spaced apart strands. The two warps are shown as separated by a layer (18) of film such as Mylar and one of the outer layers may be a film (20) of the same or like material. The other outer layer (22) is a woven fabric in which both the warp and fill are comprised of polyester fibers. The individual strands in warp (14) are aligned in parallel relationship in the direction of the length of the film layers (18) and (20) while the strands in the warp (16) are aligned in parallel relationship but in a direction which describes an acute angle of the order of about 2° to 20° preferably from 3° to 10° with the direction of the strands in layer (14).

Figure 4:
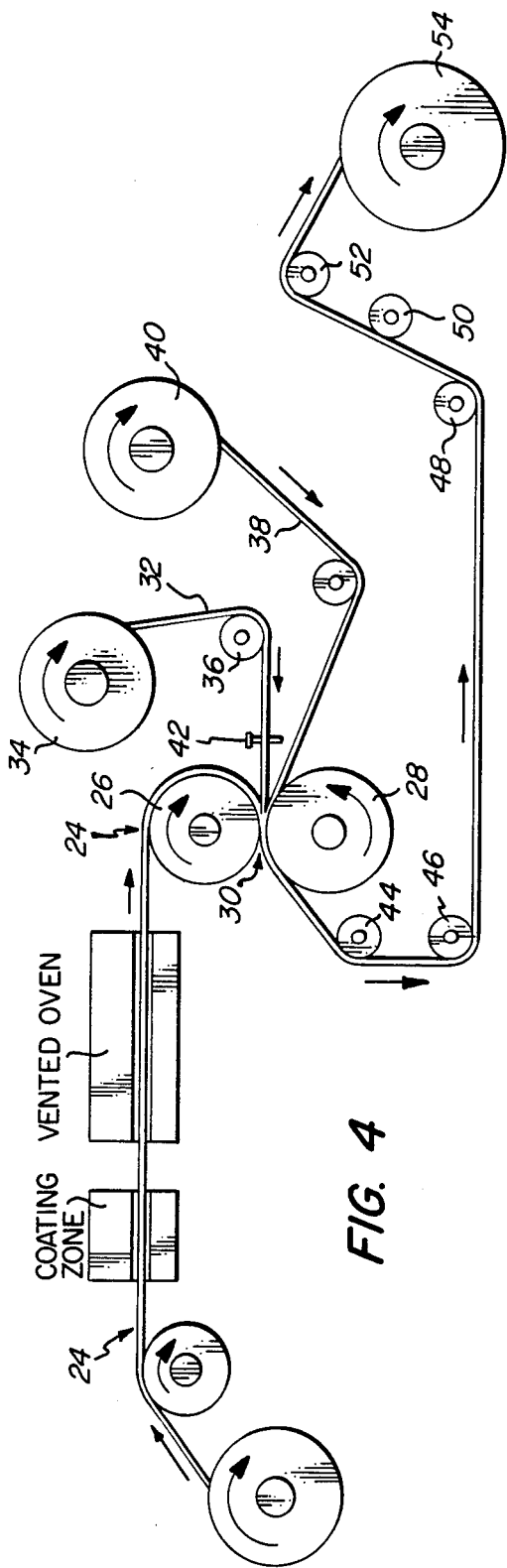
FIG. 4 is a schematic representation of an apparatus and process for the continuous manufacture of laminate in accordance with the invention.

Shown in FIG. 4 is a schematic representation of a process and apparatus for the continuous fabrication of laminates in accordance with the invention. The particular embodiment shown is that involving the formation of a laminate having a film as one outer layer, a woven fabric as the other outer layer and a warp of individual strands of reinforcing fiber interposed between the two outer layers. A section of such a laminate is that illustrated and discussed above in regard to FIG. 1. In accordance with the process illustrated in FIG. 4 a continuous web of film (24) is dispensed from a feed roll and passed through a coating zone in which zone a thin layer of adhesive solution is deposited and evenly distributed by means of a reverse roll or doctor blade to a depth of approximately 1 mil. The coated fabric is then passed continuously through a vented oven in which the solvent in the adhesive solution is removed by evaporation. The coated film is transported from the oven, with the tacky, adhesive coated side upwards, to a heated roller (26) which, together with adjoining roller 28, forms a nip (30). The rollers (26) and (28) are adapted to move synchronously, by a motor not shown, in the direction indicated by the arrows and to draw through the nip (30) the coated film (24), the warp of individual strands (32) dispensed from feed roll (34) via tension bar (36), and the woven fabric web (38) dispensed from feed roll (40). The size of the nip (30) is adjusted to provide sufficient pressure on the various layers to cause the adhesive on film (24) to penetrate the warp (32) and also the interstices of the fabric (38). The individual strands in the warp (32) being dispensed from the feed roll (34) are maintained at the desired distance apart by passage of said strands through slots spaced at appropriate distances apart in a reed screen (42) positioned immediately prior to the entry of the strands into the nip roll.

The roller (26) is maintained at a temperature such that the adhesive coating on the film web (24) will still flow when subjected to the pressure exerted in passage through the nip (30). Advantageously the temperature of the roller (26) is in the range of about 100° C. to about 200° C. depending upon the particular adhesive employed. Advantageously the temperature employed in any given instance is such as to maintain the adhesive at a temperature at which it will flow during passage through the nip roll.

After passage through the nip (30) the newly formed laminate is wound continuously via rollers (44), (46), (48), (50) and (52) on to windup roller (54). The laminate is ultimately cut into appropriate lengths and configurations in order to be fashioned into a sail or like article.

Figure 5:
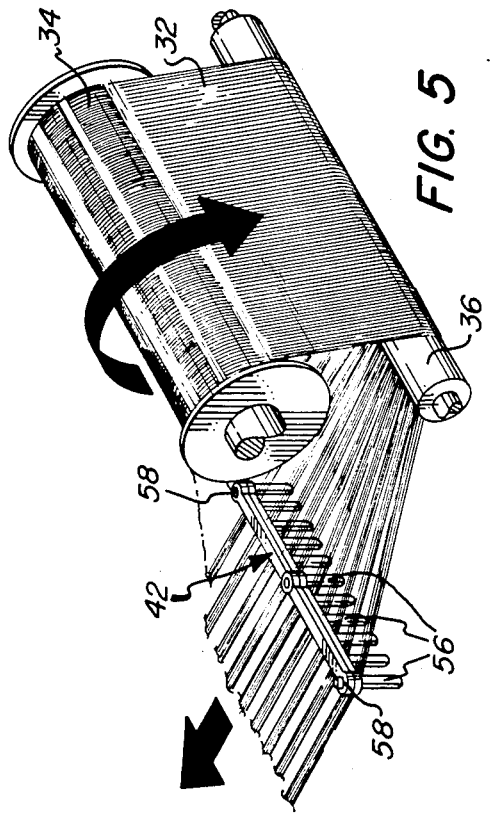
FIG. 5 is a perspective view of a part of the apparatus shown schematically in FIG. 4.

FIG. 5 shows a perspective view of the warp (32) of strands being fed from feed roll (34) and led through reed (42) before entering the nip (30) in accordance with the schematic representation shown in FIG. 4. Using the procedure and apparatus illustrated above with reference to FIGS. 4 and 5, four laminates were prepared in a continuous process from the following materials.

Laminate 1 was fabricated using a web of Mylar film of thickness 2 mils, a warp of individual parallel strands of 400 denier Kevlar fiber with an average of 20 strands per inch width of warp and a woven fabric of Dacron fibers having 70 denier warp fibers and 140 denier fill fibers. The strands of fiber in the warp insert and the warp in the woven fabric were both aligned in the direction of travel of the web in the continuous production of the laminate. The adhesive used was a polyurethane adhesive solution (Adcote 122) deposited at the rate of 1 oz. per square yard on the film layer.

Laminate 2 was prepared in exactly the same manner and using the same materials as Laminate 1, except that the Mylar film had a thickness of 1.5 mil.

Laminate 3 was prepared in exactly the same manner and using the same materials as Laminate 1 except that the Mylar film had a thickness of 1 mil. and the woven fabric was a taffeta in which the warp and the fill were of 70 denier Dacron fiber.

Laminate 4 was prepared using exactly the same materials as Laminate 3 except that the Mylar film had a thickness of 1.5 mil.

Figure 6A:
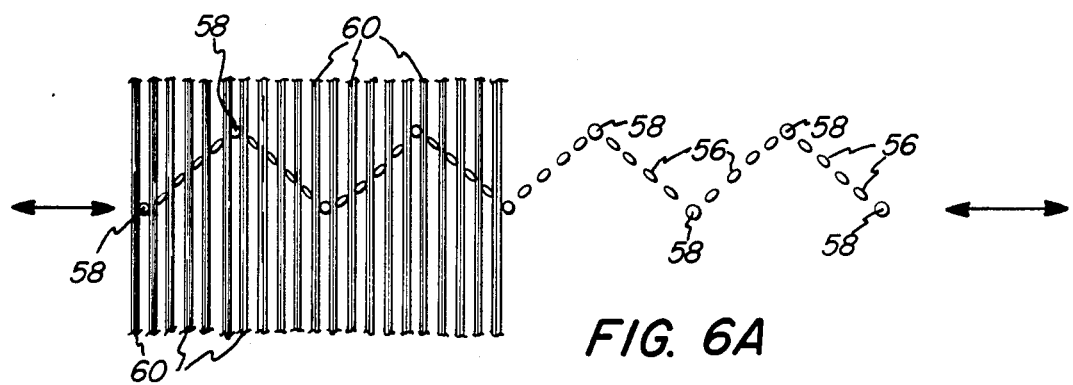
FIGS. 6A and 6B are cross-sectional views of a device which serves to continuously alter the orientation of the individual strands in the warp utilized in fabricating laminates in accordance with the invention.
Figure 6B:
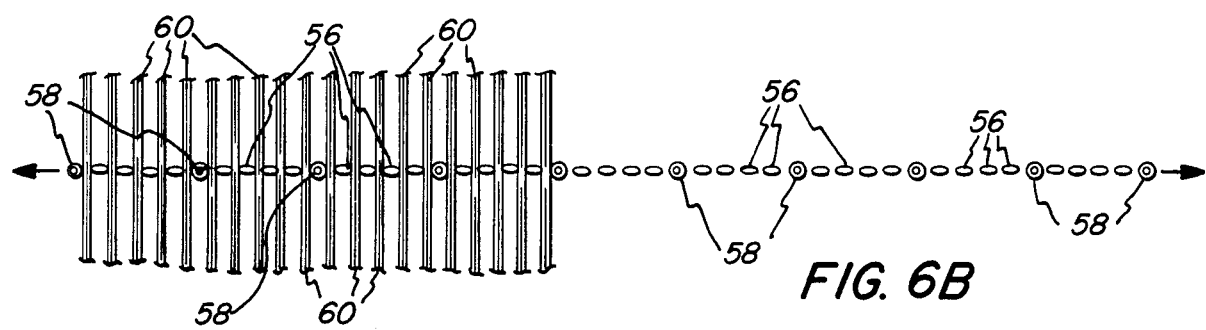

In FIGS. 6A and 6B there is illustrated, in cross-sectional view, a device which enables the orientation of the strands in the warp (32) being dispensed from the feed roll (34) as shown in FIG. 4 to be modified constantly so as to change alternately from an orientation in which the strands diverge from each other to an orientation in which the strands converge until they reach a predetermined minimum distance apart whereupon the diverging mode is reinstated until the strands reach a predetermined maximum distance apart at which point the converging mode is reinstated. This result is achieved by modifying the reed screen (42) employed as shown FIG. 4 so that it takes the form of a series of short reeds (56) hinged together at their extremities by hinges (58) which permit the reed to move between two positions in one of which the screen assumes a partially folded or concertina-like configuration as shown in FIG. 6A and, in the other of which, the screen assumes a linear configuration as shown in FIG. 6B. Appropriate reciprocating means (not shown) is provided at each end of the screen to cause the latter to reciprocate between the two positions. The individual strands (60) in the warp pass through slots in the screen in the manner shown in FIGS. 6A and 6B and the orientation of the strands is caused to change constantly in the manner described above by the reciprocating action of the screen. Immediately after passage through the screen the warp is dispensed into the nip of the rollers (26) and (28) illustrated in FIG. 4 and the particular orientation of the strands at the moment of entering the nip is retained in the resulting laminate.

Figure 7:
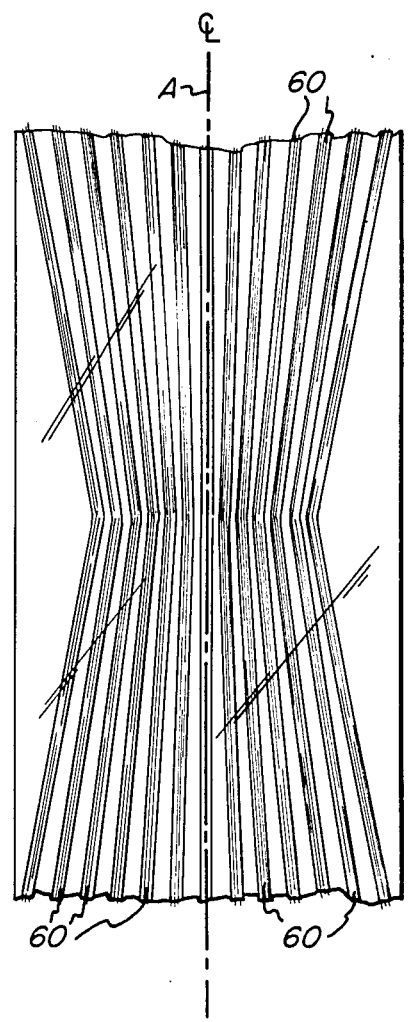
FIG. 7 is a plan view of a section of a continuous laminate prepared in accordance with an embodiment of the invention.

The section of laminate shown in plan view, looking downwardly through the film side, in FIG. 7 illustrates the orientation of the individual strands (60) in a continuous laminate prepared as described using the device illustrated in FIGS. 6A and 6B.

In a further embodiment of a process and laminate in accordance with the invention a laminate is prepared in continuous or semicontinuous manner with two layers of warp of individual spaced apart strands incorporated therein, the strands in one of the layers being oriented in parallel relationship along a direction which is offset at an angle, preferably in the range of about 2° to about 20°, and preferably about 3° to 10°, to the direction in which the strands in the other layer are aligned. Such a laminate can be fabricated in a convenient manner by fabricating a first laminate in a continuous manner as described in reference to FIG. 4 then cutting this continuous web, along the lines A1-B1, A2-B2 and A3-B3, as shown in FIG. 8, to form a series of bias cut sections each of which has ends ($A_1$-$A_2$:$A_2$-$A_3$:$B_1$-$B_2$:$B_2$-$B_3$) which were part of the selvage of the original laminate and which have a length equal to the width of the original laminate. These sections are then formed into a continuous web by assembling edge $A_1$-$A_2$ in adjoining relationship with edge $B_2$-$B_3$ on the next section using appropriate means such as thin adhesive tape. The continuous roll formed from the bias cut sections is then inverted and laminated to a second continuous laminate prepared as described previously which has the strands of the reinforcing fiber warp aligned in parallel in the direction of travel of the web thereby achieving the desired laminate with two layers of reinforcing strands aligned in directions which describe an acute angle with respect to each other. A partial cross-section of the resulting laminate is shown in FIG. 8A.

Figure 8A:
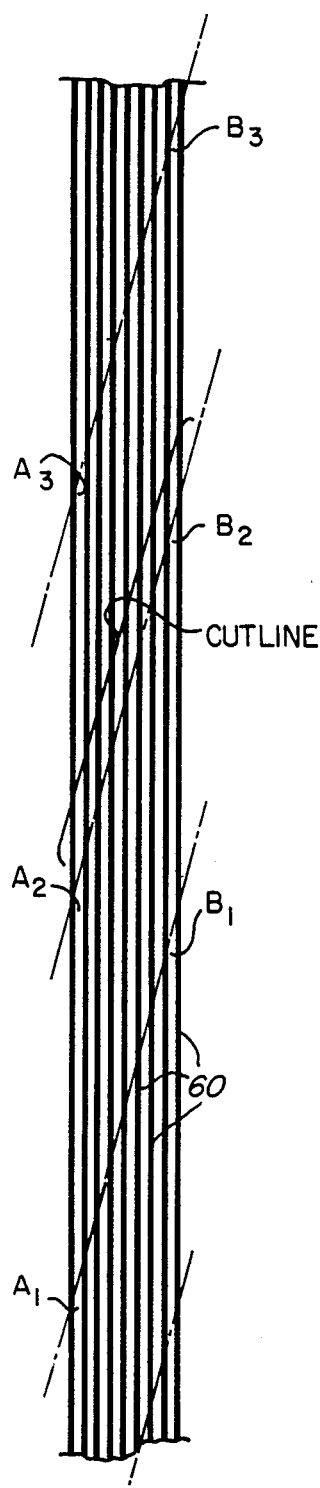
FIG. 8A is a plan view of yet another section of continuous laminate prepared in accordance with the invention.
Figure 8B:
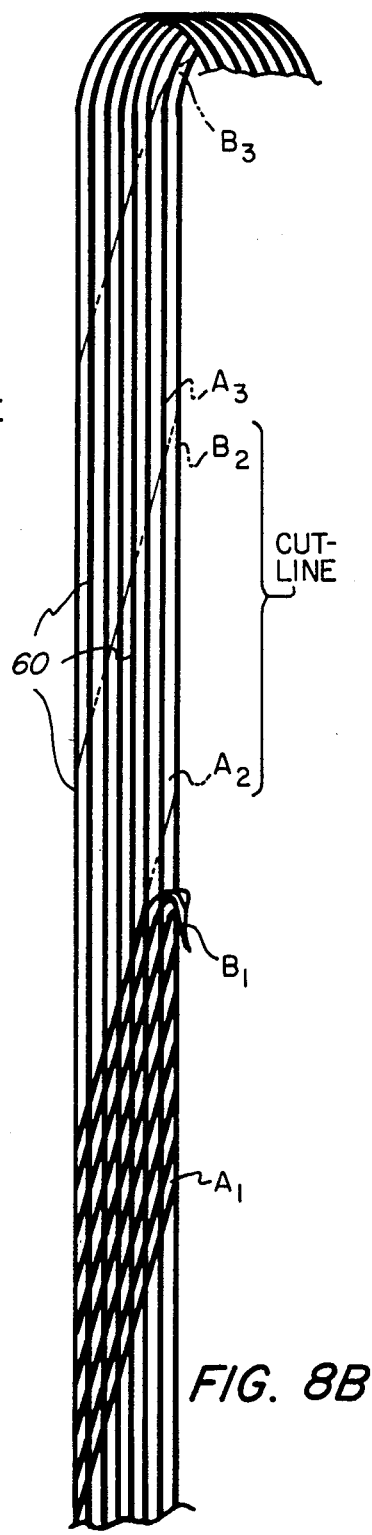
FIG. 8 is a plan view of another section of continuous laminate prepared in accordance with the invention.

In an alternate method of preparing the laminate of which a partial view is shown in FIG. 8A the individual bias cut sections illustrated in FIG. 8 are not rejoined into a continuous web as described above but are fed individually onto the adhesive coated web being used to form the ultimate laminate.

A flexible laminate having two inner layers comprising warps of individual strands with the strands in each layer being oriented in the same direction, can be prepared readily in continuous manner. Thus, a first laminate is prepared utilizing the process and apparatus described above with reference to FIG. 4 and the laminate so prepared is then used, in place of the woven fabric (38), in a second laminating run. In utilizing the first laminate in place of the fabric in this manner the first laminate is fed to the nip (30) with the film layer uppermost. In an alternative way of preparing a laminate having two inner layers comprising warps of individual strands with the strands in each layer oriented in the same direction, a first laminate is prepared in accordance with the procedure illustrated in FIG. 4. This first laminate is then used in place of the film (24) in carrying out a second laminate formation. The first laminate can be used with either the film layer or the fabric layer uppermost resulting in a finished laminate in which the fabric or the film layer, respectively, becomes an outer layer in the resulting finished laminate.

In yet another alternative form of preparing the laminate with two warp layers with strands oriented in the same direction, a first laminate is formed as described in reference to FIG. 4. This laminate is then employed, preferably with the film layer uppermost, in place of the film (24) using the process described in reference to FIG. 4 and the fabric (38) used in the process of FIG. 4 is replaced by a film so that the resulting laminate has layers which are film/warp insert/film/warp insert/fabric.

Although specific embodiments of the invention have been discussed above in some detail it is to be understood that these are offered for purposes of illustration only and are not to be construed as limiting. The actual scope of the invention is defined by the claims which are set forth below.

What is claimed is:

1. A sailcloth comprising at least three coextensive layers bonded together at their interfaces by a synthetic adhesive resin wherein one outer layer is a film of dimensionally stable synthetic polyester resin, the second outer layer is selected from the group consisting of a warp-knit fabric, a scrim fabric, taffeta and a film of dimensionally stable synthetic polyester resin, and wherein there are one or more inner layers one of which comprises a weft-free warp of strands of a stretch resistant polymer having a denier in the range of about 20 to about 1000.

2. A sailcloth according to claim 1 wherein said warp of strands is fabricated from a polyamide and said warp contains from about 1 to about 50 strands per inch.

3. A sailcoth according to claim 1 wherein said second outer layer is a fabric and the warp in said fabric is aligned in the same direction as the warp of said polymer strands.

4. A sailcloth according to claim 1 wherein said second outer layer is a fabric and the warp in said fabric is aligned at an acute angle to the direction of the warp of said polymer strands.

5. A sailcloth according to claim 1 wherein the strands of polymer in said warp are parallel and aligned at an angle to the selvage of said sailcloth.

6. A sailcloth according to claim 1 which also comprises one or more additional inner layers each of said layers being independently selected from the group consisting of a warp-knit fabric, a scrim fabric, taffeta, a film of dimensionally stable synthetic polyester resin and a warp of spaced apart strands of a stretch resistant polymer having a denier in the range of about 200 to about 2000.

7. A sailcloth according to claim 6 wherein said additional inner layer is a warp of parallel spaced apart strands of a polyamide said strands being oriented at an acute angle to the strands in the other warp of parallel spaced apart strands of polyamide present in said laminate.

8. A sailcloth according to claim 1 wherein said spaced apart strands in said warp are substantially linear.

9. A sailcloth according to claim 1 wherein said spaced apart strands of polyamide in said warp are nonlinear and alternately converge towards and diverge away from each other as they traverse said inner layer of said fabric.

10. A sailcloth comprising a three ply laminate wherein the inner ply is a weft-free warp of strands of an aromatic polyamide having a denier in the range of about 200 to about 2000 said warp containing from about 5 to about 20 strands per inch one of said outer plies is a film of dimensionally stable polyester and the other of said outer plies is a fabric woven from polyester fibers, said plies being bonded together at their abutting surfaces by a synthetic polymer adhesive.

11. A sailcloth according to claim 10 wherein said strands in said warp of the inner ply are in parallel relationship.

12. A sailcloth according to claim 10 wherein said strands in said warp of the inner ply are nonlinear and alternately converge towards and diverge away from each other as they traverse said inner ply.

13. A sailcloth which comprises a film of dimensionally stable synthetic resin reinforced by a weft-free warp of strands of a stretch resistant synthetic polymer and aligned substantially in the direction in which maximum strength is required in said laminate.

* * * * *